(12) United States Patent
Falster et al.

(10) Patent No.: US 9,487,114 B2
(45) Date of Patent: Nov. 8, 2016

(54) HEADREST SYSTEM AND METHOD OF ADJUSTING A HEADREST

(71) Applicant: Schukra Gerätebau GmbH, Berndorf (AT)

(72) Inventors: Frank Falster, Nuremberg (DE); Klaus Junker, Diessen am Ammersee (DE)

(73) Assignee: Schukra Gerätebau GmbH, Berndorf (AT)

( * ) Notice: Subject to any disclaimer, the term of this patent is extended or adjusted under 35 U.S.C. 154(b) by 0 days.

(21) Appl. No.: 14/417,941

(22) PCT Filed: Aug. 13, 2013

(86) PCT No.: PCT/EP2013/066902
§ 371 (c)(1),
(2) Date: Jan. 28, 2015

(87) PCT Pub. No.: WO2014/026983
PCT Pub. Date: Feb. 20, 2014

(65) Prior Publication Data
US 2015/0183347 A1    Jul. 2, 2015

(30) Foreign Application Priority Data

Aug. 13, 2012 (EP) .................................. 12005854
Sep. 21, 2012 (EP) .................................. 12185473

(51) Int. Cl.
*A47C 1/10*    (2006.01)
*B60N 2/48*    (2006.01)
*B60N 2/02*    (2006.01)

(52) U.S. Cl.
CPC ............ *B60N 2/4805* (2013.01); *B60N 2/482* (2013.01); *B60N 2/4829* (2013.01);

(Continued)

(58) Field of Classification Search
CPC    B60N 2/4852; B60N 2/4829; B60N 2/4864; B60N 2/4805; B60N 2002/4897
USPC .................................................... 297/410, 391
See application file for complete search history.

(56) References Cited

U.S. PATENT DOCUMENTS 4,193,631 A    3/1980    Hobley
4,222,608 A *  9/1980    Maeda .................... A47C 7/38
                                                   297/391

(Continued)

FOREIGN PATENT DOCUMENTS

CN    201833915 U    5/2011
DE    197 817 82 B4  7/2007

(Continued)

OTHER PUBLICATIONS

European Search Report and Search Opinion, received in European Patent Application No. 12005854.0, dated Jan. 18, 2013 (6 pages).

(Continued)

*Primary Examiner* — Jose V Chen
(74) *Attorney, Agent, or Firm* — Michael Best & Friedrich LLP

(57) ABSTRACT

A headrest system comprises a headrest, a guide bracket to which the headrest is mounted and an actuator coupled to the headrest and the guide bracket. The actuator is configured to displace the headrest relative to the guide bracket. The actuator comprises a spindle transmission and a power drive coupled to the spindle transmission. The spindle transmission comprises a spindle and a spindle nut engaged with the spindle. The power drive is arranged in a cavity defined within an outer shell of the headrest.

17 Claims, 8 Drawing Sheets

(52) U.S. Cl.
CPC ......... *B60N 2/4864* (2013.01); *B60N 2/4882* (2013.01); *B60N 2/0224* (2013.01); *B60N 2/0232* (2013.01); *B60N 2/48* (2013.01); *B60N 2/4817* (2013.01); *B60N 2/4852* (2013.01); *B60N 2002/4894* (2013.01); *B60N 2002/4897* (2013.01)

(56) References Cited

U.S. PATENT DOCUMENTS

| | | | | |
|---|---|---|---|---|
| 4,466,663 | A * | 8/1984 | Oishi | B60N 2/4811 297/391 |
| 4,668,014 | A * | 5/1987 | Boisset | B60N 2/4852 297/408 |
| 4,923,250 | A * | 5/1990 | Hattori | B60N 2/4829 297/408 |
| 5,011,225 | A * | 4/1991 | Nemoto | B60N 2/4852 297/408 |
| 5,103,691 | A | 4/1992 | Periou | |
| 5,222,784 | A * | 6/1993 | Hamelin | B60N 2/4852 297/408 |
| 5,669,666 | A * | 9/1997 | Lee | B60N 2/4852 297/408 |
| 5,992,937 | A | 11/1999 | Pilhall | |
| 6,062,644 | A | 5/2000 | Lance | |
| 6,088,640 | A * | 7/2000 | Breed | B60N 2/002 280/735 |
| 6,352,285 | B1 | 3/2002 | Schulte | |
| 7,232,187 | B1 * | 6/2007 | Sundararajan | B60N 2/0232 297/391 |
| 7,523,987 | B2 | 4/2009 | Yamaguchi | |
| 7,543,888 | B2 * | 6/2009 | Kuno | B60N 2/0232 297/353 |
| 7,588,115 | B2 | 9/2009 | Breed | |
| 7,871,129 | B2 * | 1/2011 | Boes | B60N 2/4814 297/404 |
| 7,878,597 | B2 * | 2/2011 | Bokelmann | B60N 2/4829 297/410 |
| 7,946,653 | B2 * | 5/2011 | Robert | B60N 2/4814 297/408 |
| 8,020,935 | B2 * | 9/2011 | Becker | B60N 2/482 297/410 |
| 8,038,219 | B2 * | 10/2011 | Boes | B60N 2/4885 297/406 |
| 8,272,696 | B2 * | 9/2012 | Hong | B60N 2/4829 297/391 |
| 8,573,702 | B2 * | 11/2013 | Tscherbner | B60N 2/4811 297/410 |
| 8,657,378 | B2 * | 2/2014 | Kunert | B60N 2/4814 297/391 |
| 8,899,685 | B2 * | 12/2014 | Haeske | B60N 2/4823 297/404 |
| 8,939,512 | B2 * | 1/2015 | Boes | B60N 2/4808 297/408 |
| 2001/0028191 | A1 * | 10/2001 | Lance | A47C 7/38 297/410 |
| 2002/0043860 | A1 | 4/2002 | Dinkel | |
| 2004/0195894 | A1 * | 10/2004 | Pal | B60N 2/4279 297/406 |
| 2006/0273636 | A1 | 12/2006 | Sugimoto | |
| 2007/0145803 | A1 | 6/2007 | Kopetzky | |
| 2007/0296260 | A1 | 12/2007 | Stossel | |
| 2009/0152925 | A1 * | 6/2009 | Kim | B60N 2/4829 297/410 |
| 2010/0045090 | A1 * | 2/2010 | Brunner | B60N 2/4814 297/408 |
| 2012/0112510 | A1 | 5/2012 | Ishimoto | |

FOREIGN PATENT DOCUMENTS

| | | |
|---|---|---|
| DE | 10 2008 060 641 A1 | 6/2009 |
| DE | 10 2009 016 835 A1 | 10/2010 |
| EP | 0 011 009 A1 | 5/1980 |
| EP | 0497705 A1 | 8/1992 |
| EP | 1 123 831 A1 | 8/2001 |
| WO | 00/07841 | 2/2000 |

OTHER PUBLICATIONS

European Search Report and Search Opinion, received in European Patent Application No. 12185473.1, dated Jan. 17, 2013 (6 pages).
International Search Report and Written Opinion, received in International Patent Application No. PCT/EP2013/066902, dated Sep. 30, 2013 (9 pages).

* cited by examiner

HEADREST SYSTEM AND METHOD OF ADJUSTING A HEADREST

TECHNICAL FIELD

Embodiments of the invention relate to a headrest system and to a method of adjusting a headrest. Embodiments of the invention relate in particular to a headrest which can be adjusted using a power drive, so as to be displaced relative to a backrest of a seat.

BACKGROUND

A wide variety of seats is provided with headrests. For enhanced comfort or security reasons, the headrest may be adjustable. For illustration, an adjusting mechanism may be provided which displaces the headrest relative to a backrest of the seat. Simple mechanical mechanisms which require the user to push the headrest to a desired location may be used in some applications. However, in many cases, it is desirable that the headrest can be displaced using a power drive.

Such automated headrest adjusting mechanisms may include a motor and a transmission. Conventional headrest adjusting mechanisms frequently have been designed such that the motor which ultimately drives the headrest displacement is located in the backrest of the seat. In such a configuration, installation space must be reserved in the backrest for installing the motor and, possibly, also the transmission in the backrest. This may be undesirable. For illustration, with an increasing number of functions which is integrated into modern vehicle seats, installation space may become an issue. Further, in conventional approaches, the design of the backrest and the design of the headrest mounted thereto must be specified to such an extent that interoperability can be ensured between the drive mechanism for headrest adjustment and the headrest that will be used. Design limitations may result therefrom, for illustration in terms of interchangeability of components. Attaching the headrest to the seat may require dedicated working steps for coupling the drive mechanism to the headrest.

SUMMARY OF THE INVENTION

There is a need in the art for an improved adjusting mechanism for a headrest. In particular, there is a need in the art for a headrest system and method which provide advantages in terms of installation space requirements for an adjusting mechanism. There is also a need for a headrest system and method that allow an adjustable headrest to be easily attached to a seat backrest, for example to a vehicle seat backrest.

According to embodiments of the invention, a headrest system and a method of adjusting a headrest as defined in the independent claims are provided. Further, a seat comprising a headrest system is provided. The dependent claims define embodiments.

A headrest system according to an embodiment comprises a headrest, a guide bracket to which the headrest is mounted such that the headrest is displaceable relative to the guide bracket; and an actuator. The actuator is coupled to the headrest and the guide bracket. The actuator is configured to displace the headrest relative to the guide bracket. The actuator comprises a spindle transmission and a power drive coupled to the spindle transmission. The spindle transmission comprises a spindle and a spindle nut engaged with the spindle. The power drive is arranged in a cavity defined in an interior of the headrest.

By using an actuator to displace the headrest relative to the headrest bracket, with the power drive being arranged in a cavity within the headrest, the installation space required in a backrest of a seat for headrest adjustment may be reduced. By using a spindle transmission that is driven by the power drive, an actuator providing sufficient adjustment forces, e.g. up to 200 N, may be configured to have a small construction space, allowing it to be mounted within the headrest.

The spindle and the spindle nut may also be arranged in the cavity. The full actuator may be enclosed by an outer shell of the headrest.

The headrest and/or the guide bracket may comprise a guide element which defines a travel path of the headrest relative to the guide bracket. The spindle may extend along the travel path defined by the guide element. The spindle may extend parallel to the travel path defined by the guide element. Thereby, a translational displacement of the headrest relative to the guide bracket may be readily realized.

A longitudinal axis of the spindle may be parallel to a longitudinal axis of the guide element. Thereby, a linear displacement of the headrest relative to the guide bracket may be readily realized.

The actuator may be configured to bring about a translational displacement of the headrest along the guide element. The actuator may be configured such that actuation of the power drive effects a relative displacement between spindle nut and spindle along the longitudinal axis of the spindle, which in turn may cause the headrest to be displaced relative to the guide bracket.

The headrest system may be configured such that the power drive, the spindle and the spindle nut may be located within the cavity for any position of the headrest relative to the guide bracket along the travel path.

The spindle may be flexible. The spindle may be configured such that, when a normal force of about 250 N is exerted onto the headrest, the spindle is still elastically deformed. Thereby, the danger of breakage may be reduced. The spindle may be a flexible shaft or flex-shaft which is provided with an external thread. The flexible shaft may have a metal core comprising one metal wire or a plurality of metal wires. The flexible shaft may have an external thread. The flexible shaft may have a metal wire helix on its outer surface for forming the external thread.

The spindle may be a rigid spindle. The spindle may be a rigid spindle which is mounted such that it can pivot about an axis transverse to the longitudinal axis of the spindle.

The spindle may have a helical external thread and the spindle nut may have a helical internal thread which engages the helical external thread of the spindle.

The power drive may be attached to the guide bracket.

The guide bracket may comprise a pair of rods and a cross member extending between the pair of rods. The power drive may be attached to the cross member. The power drive may be received in a recess of the cross member. Thereby, robust mounting in the compact space within the headrest may be attained.

The power drive may comprise a motor, in particular an electric motor. The actuator may have at least one worm transmission which is coupled between the motor and the spindle transmission. The actuator may have a two-stage worm transmission coupled between the motor and the spindle transmission. A worm of a first worm transmission of the two-stage worm transmission may be coupled to an output shaft of the motor in a torque-prove manner. A worm gear of a second worm transmission of the two-stage worm transmission may be coupled to the spindle or the spindle nut in a torque-prove manner.

The spindle may be attached to the headrest such that it does not rotate about its longitudinal axis. The power drive may be configured to rotationally drive the spindle nut.

The spindle may have at least one attachment mount attached to the headrest. The headrest may have at least one mating attachment feature to which the at least one attachment mount is attached. The power drive may be configured to rotationally drive the spindle nut. The attachment mount and attachment feature may be configured such that the spindle may be pivoted about an axis which is transverse to a longitudinal axis of the spindle. The attachment mount may be formed from a plastic material which is molded onto the spindle. A spindle with one or several integrally formed attachment mount(s) may be used.

The spindle may have two attachment mounts provided at opposing ends of the spindle, the two attachment mounts being respectively attached to the headrest. The two attachment mounts may be formed from a plastic material which is molded onto the spindle.

The spindle nut may be attached to the headrest such that it does not rotate about its longitudinal axis. The power drive may be configured to rotationally drive the spindle.

An end stop may be provided on at least one end of the spindle. Thereby, the travel path of the headrest may be delimited by the actuator, without requiring separate stops separate from the actuator. End stops may be provided on both ends of the spindle. The end stop(s) may be integrally formed with attachment mounts at which the spindle is attached to the headrest. The end stop(s) may be formed from a plastic material which is molded onto the spindle. A spindle with integrally formed end stop(s) may be used.

Alternatively or additionally, an end stop which delimits a travel path of the headrest relative to the guide bracket may be formed on a headrest cover, e.g. on a half shell of the headrest.

The guide bracket may have backrest mount for fixedly attaching the guide bracket to a backrest of a seat.

According to another embodiment, a seat is provided which comprises a backrest and a headrest system according to any aspect or embodiment. The guide bracket of the headrest system may be attached to the backrest.

The seat may be a vehicle seat. The seat may be an automotive vehicle seat. The seat may be a car seat.

A method of adjusting a headrest according to an embodiment uses a power drive. The headrest is mounted so as to be displaceable relative to a guide bracket. The method comprises activating the power drive arranged in a cavity defined within an outer shell of the headrest to drive a spindle transmission, the spindle transmission comprising a spindle and a spindle nut engaged with the spindle, the spindle transmission being arranged to cause a relative displacement between the headrest and the guide bracket when the spindle transmission is driven by the power drive.

The method may be performed using the headrest system of any one aspect or embodiment.

Further features of the method and effects respectively attained thereby correspond to features of the headrest system according to embodiments.

The devices and methods according to various embodiments may be utilized for adjusting a headrest. The devices and methods according to the various embodiments may in particular be utilized for adjusting a headrest of a vehicle seat, in particular an automotive vehicle seat.

BRIEF DESCRIPTION OF THE SEVERAL VIEWS OF THE DRAWINGS

Additional features and advantages of the invention will become more readily appreciated from the following detailed description of preferred or advantageous embodiments with reference to the accompanying drawings.

DESCRIPTION OF EMBODIMENTS

Figure 1:
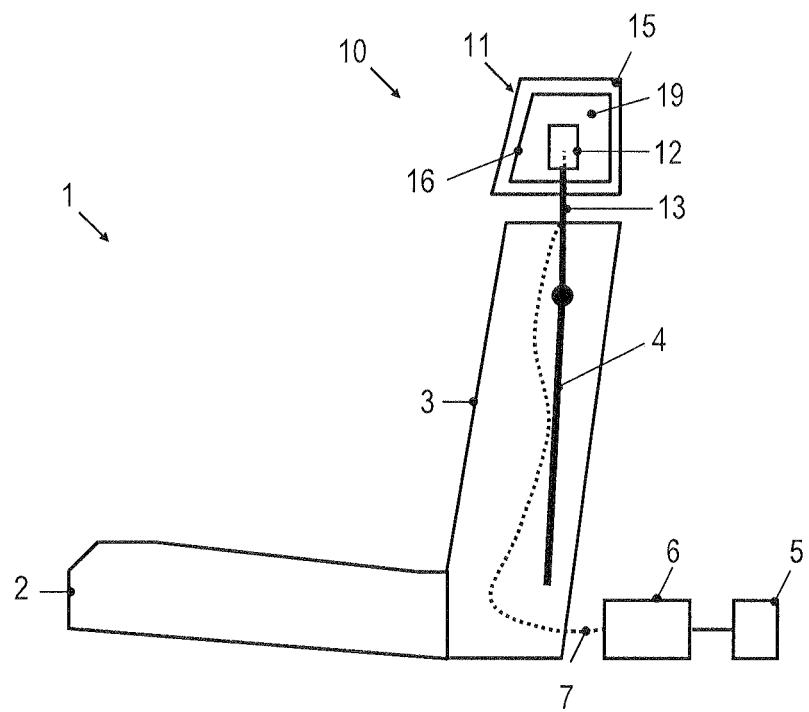
FIG. 1 is a schematic view of a seat according to an embodiment.

Exemplary embodiments of the invention will now be described with reference to the drawings. While some embodiments will be described in the context of specific fields of application, such as in the context of automotive vehicle seating, the embodiments are not limited to this field of application. The features of the various embodiments may be combined with each other unless specifically noted otherwise.

In the drawings, like reference numerals refer to like elements.

FIG. 1 is a schematic view of a seat 1 according to an embodiment. The seat 1 may be configured as a vehicle seat. The seat 1 may be configured as an automotive vehicle seat. The seat 1 may be configured as a car seat.

The seat 1 generally comprises a seat member 2, a backrest 3 and a headrest system 10. The headrest system 10 may be mounted to the backrest 3. The headrest system 10 may include a guide bracket 13 with rods which have lower ends mounted to the backrest 3. The lower ends of the rods of the guide bracket 13 may be attached to a frame 4 of the backrest 3.

The headrest system 10 includes a headrest 11 formed so as to support an occupant's head. The headrest 11 has an internal cavity 19. Adjustment of the headrest 11 is performed using an actuator 12. The actuator 12 is arranged in the cavity 19 which is formed in an interior of the headrest 11. When the actuator 12 is actuated, e.g. by supplying electrical power thereto, the actuator 12 displaces the headrest 11 relative to the guide bracket 13. The guide bracket 13 may remain stationary relative to the frame 4 of the backrest 3. The guide bracket 13 may be arranged such that it is not displaced relative to the frame 4 of the backrest 3 when a height adjustment of the headrest 11 is performed.

The headrest 11 may have any configuration which provides an internal cavity within the headrest 11, so that the headrest 11 can house the actuator 12. For illustration, the headrest 11 may include a headrest cover 16. The headrest cover 16 may be formed from plastic. A fabric cover 15 may be provided around the headrest cover 16. The fabric cover 15 may include a padding material for increased comfort. The headrest cover 16 may be configured so as to define the external shape of the headrest 11 and to provide structural rigidity to the headrest 11. The headrest cover 16 may be configured such that it defines the internal cavity 19 in which the actuator 12 is housed.

A controller 6 may control operation of the actuator 12. The controller 6 may be coupled to the actuator through an electrical connection 7. The controller 6 may control the voltage applied at the electrical connection 7 to thereby control activation of the actuator. The electrical connection 7 may pass through an internal cavity in rods of the guide bracket 13 which mount the headrest system 10 to the backrest 3. The control may be performed in different ways. A user interface 5 may be provided which is coupled to the controller 6, so as to allow a user to effect a displacement of the headrest 11 under the control of a user action. Alternatively or additionally, the controller 6 may automatically control the actuator 12 when a certain driver is recognized, to thereby set the headrest 11 to a height suitable for the respective driver. An identification of a suitable headrest height may be automatically performed based on an identifier stored in a vehicle authorization element (vehicle key or corresponding key-like element) and a look-up table which stores heights for the headrest 11 for various identifiers. The controller 6 may automatically set the height of the headrest 11 by activating the actuator 12, when required, when the identifier is read from the vehicle authorization element. The controller 6 may include a memory which stores a present position of the headrest 11. Alternatively or additionally, the controller 6 may automatically control the actuator 12 in response to a critical event, such as a collision.

With reference to FIG. 2 to FIG. 15, configurations of headrest systems according to embodiments will be described in detail. The headrest systems may be used as headrest system 10 in the seat 1 of an embodiment.

Generally, the actuator of the headrest system includes a spindle transmission and a power drive which drive the spindle transmission. The spindle transmission includes a spindle and a spindle nut threadingly engaged therewith. The spindle and spindle nut may have a longitudinal axis. One of the spindle and the spindle nut may be mounted such that it is rotatable about its longitudinal axis. The other one of the spindle and the spindle nut may be mounted such that it is not rotatable about its longitudinal axis. The actuator includes a power drive which rotationally drives the one of the spindle and the spindle nut which is rotatable about its longitudinal axis. The power drive and the one of the spindle and the spindle nut which is rotatable about its longitudinal axis may be supported either on the guide bracket 13 or on the headrest 11. The other one of the spindle and the spindle which is not rotatable about its longitudinal axis may be supported on the other one of the guide bracket 13 or the headrest 11. The one of the spindle and spindle nut which is mounted on the headrest moves relative to the guide bracket in a translational fashion, together with the headrest, when the headrest is displaced. The other one of the spindle and spindle nut which is mounted to the guide bracket is not displaced in a translational manner, but may rotate under the action of the power drive.

The actuator may comprise a motor and a gearbox for speed reduction. The gearbox may include at least one worm transmission which is coupled between an output shaft of the motor and the one of the spindle and the spindle nut which is rotatable about its longitudinal axis. The gearbox may include a two-stage worm transmission having a first worm transmission and a second worm transmission coupled between an output shaft of the motor and the one of the spindle and the spindle nut which is rotatable about its longitudinal axis. Such configurations allow the forces required for headrest system adjustment, which may be up to 200 N, to be attained with a compact actuator. Such an actuator may be dimensioned such that it can be mounted in the cavity in the interior of the headrest.

The spindle may be flexible. The spindle may be configured such that, when a normal force of about 250 N is exerted onto the headrest, the spindle is still elastically deformed. Thereby, the danger of breakage may be reduced. The spindle may be a flexible shaft or flex-shaft which is provided with an external thread. The flexible shaft may have a metal core comprising one metal wire or a plurality of metal wires. The flexible shaft may have an external thread. The flexible shaft may have a metal wire helix on its outer surface for forming the external thread. Other configurations of the spindle may be used. For illustration, the spindle may be formed from a plastic material having high durability. For further illustration, the spindle may be formed as a rigid spindle.

Figure 2:
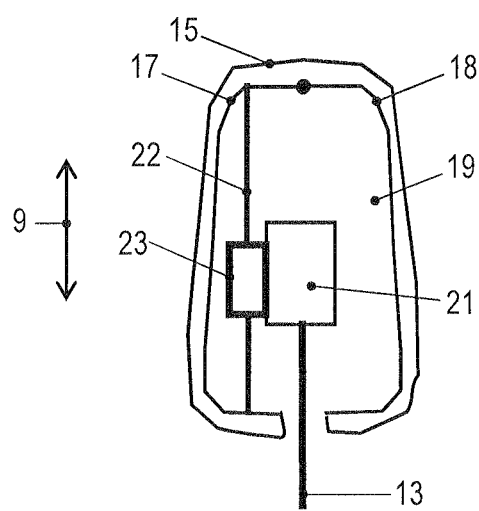
FIG. 2 is a schematic cross-sectional view of a headrest system according to an embodiment.

FIG. 2 is a schematic cross-sectional view of a headrest system of an embodiment. The cross-section is taken in a plane in which a spindle of a spindle transmission extends and which is perpendicular to a transverse centre plane of the headrest. The actuator generally includes a power drive 21 and a spindle transmission. The spindle transmission includes a spindle 22 and a spindle nut 23 through which the spindle 22 extends. The spindle nut 23 may have an internal helical thread. The spindle 22 may have a mating external helical thread. The external thread of the spindle 22 and the internal thread of the spindle nut 23 may be threadingly engaged.

The headrest system may be configured such that the actuator with the power drive 21, the spindle 22 and the spindle nut 23 remains positioned in the cavity 19 of the headrest for any position which the headrest can have relative to the guide bracket 13 when being displaced by the actuator.

When the headrest includes a headrest cover which defines the outer shape of the headrest, the headrest cover may be formed of a plurality of shells. Each one of the shells may be formed from plastic. The shells may be attached to each other. For illustration, the headrest cover may include a first half shell 17 and a second half shell 18 which, in combination, form the headrest cover or another component 16 of the headrest. Upon assembly of the headrest system, the actuator may be mounted to one of the half shells 17, 18. The other one of the half shells may subsequently be attached thereto. Thereby, the actuator is housed in the cavity in the interior of the headrest. The headrest cover includes recesses through which rods of the guide bracket 13 extend.

Using the actuator, the headrest 11 may be displaced along a direction 9 which may be the height direction, for example. The headrest 11 may be displaced relative to the rods of the guide bracket 13 which, in the installed state, attach the headrest system to the backrest.

Figure 3:
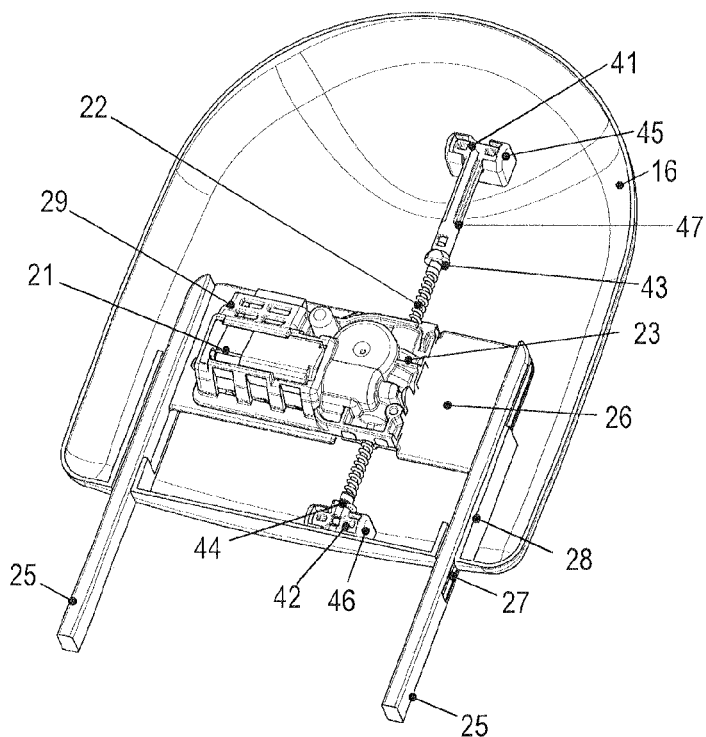
FIG. 3 is a perspective view of a headrest system according to an embodiment.
Figure 4:
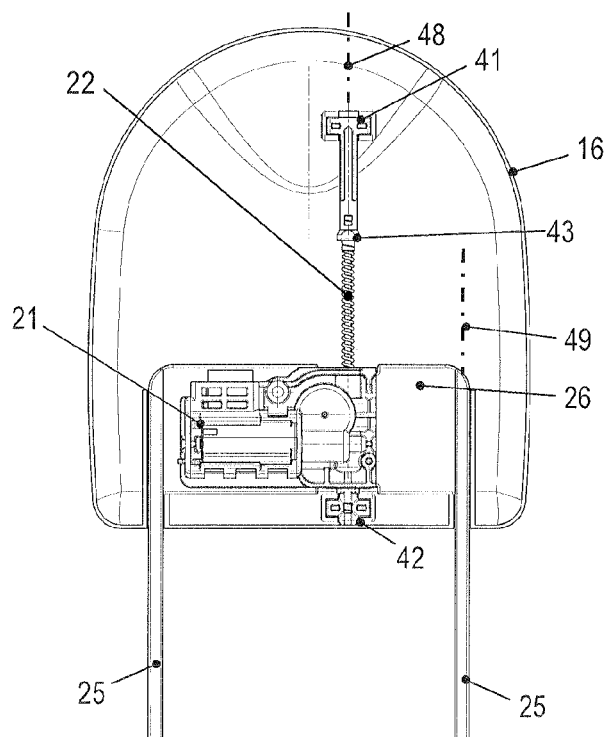
FIG. 4 is a plan view of the headrest system of FIG. 3.

With reference to FIG. 3 to FIG. 6, the configuration of a headrest system according to an embodiment will be explained in more detail. Features which correspond, in terms of configuration or function, to features explained with reference to FIG. 1 or FIG. 2 are designated with the same reference numerals. FIG. 3 shows a perspective view of the headrest system. FIG. 4 shows a plan view of the headrest system.

The guide bracket which is used to mount the headrest system to the backrest of the seat includes a pair of rods 25. A cross member 26 may extend between the rods 25. The guide bracket has a first guide element 27. The first guide element 27 may be a wall of the guide rods 25 and/or may include additional features such as recesses or projections on the wall of the guide rods 25. A component 16 of the headrest has a second guide element 28. The second guide element 28 may be a wall formed on the component 16 of the headrest. The second guide element 28 may include additional features such as recesses or projections on the wall of the part 16 of the headrest which may be configured to mate with the first guide element 27. The first guide element 27 and the second guide element 28 may be engaged with each other. The first guide element 27 and the second guide element 28 may define a travel path of the headrest relative to the guide bracket. The first guide element 27 and the second guide element 28 may have a longitudinal axis 49 along which the headrest is displaceable relative to the guide bracket.

In the headrest system of FIG. 3 to FIG. 6, the spindle nut 23 is mounted such that it is rotatable about its longitudinal axis 48. The spindle 22 is mounted such that it cannot rotate about its longitudinal axis 48. The longitudinal axis 48 of the spindle nut 23 and spindle 22 is parallel to the longitudinal axis 49 of the guide elements which defines the travel path of the headrest.

The power drive 21 and spindle nut 23 are mounted to the rods 25 which, in the installed state, attach the headrest system to the backrest. The power drive 21 and spindle nut 23 may be attached to the cross member 26. The cross member 26 may have a recess 29, such as a cut-out, in which the power drive 21 and spindle nut 23 are disposed. The power drive 21 includes an electric motor and may include a speed reduction transmission coupled between an output shaft of the electric motor and the spindle nut 23.

The spindle 22 is attached to the component 16 of the headrest. The component 16 may be or may include a half shell of a headrest cover. The spindle 22 may be attached to the component 16 at both ends of the spindle 22. The spindle 22 may have a first attachment mount 41 at a first end and a second attachment mount 42 at an opposing second end. The first attachment mount 41 may be engaged with a first mating attachment feature 45 on the component 16. The second attachment mount 42 may be engaged with a second mating attachment feature 46 on the component 16. The first attachment mount 41 and mating first attachment feature 45 may be configured such that the first end of the spindle 22 may pivot about an axis which is transverse to the longitudinal axis 48 of the spindle. The second attachment mount 42 and mating second attachment feature 46 may be configured such that the second end of the spindle 22 may pivot about another axis which is transverse to the longitudinal axis 48 of the spindle. The spindle 22 may be flexible such that it can deflect under a force applied normal to the longitudinal axis 48.

The actuator may include a stop or a plurality of stops to delimit the travel of the headrest relative to the guide bracket. A first end stop 43 may be provided at the first end of the spindle 22. The first end stop 43 may delimit movement of the spindle relative to the power drive 21 when the first end stop 43 comes into abutment with a stop surface on a housing of the power drive 21. The stop surface which engages the first end stop 43 may also be provided on the cross member 26 or another component. The first end stop 43 may be integrally formed with the first attachment mount 41. The first end stop 43 and the first attachment mount 41 may be provided on an element 47 which is attached to the first end of the spindle 22. A second end stop 44 may be provided at the second end of the spindle 22. The second end stop 44 may delimit movement of the spindle relative to the power drive 21 when the second end stop 44 comes into abutment with another stop surface on the housing of the power drive 21. The stop surface which engages the second end stop 44 may also be provided on the cross member 26 or another component. The second end stop 44 may be integrally formed with the second attachment mount 42. The second end stop 44 and the second attachment mount 42 may be provided on an element which is attached to the second end of the spindle 22.

Alternatively or additionally to an end stop or several end stops formed on the spindle, an end stop or several end stops may also be formed on the headrest cover 16, e.g. on one of the half shells 17, 18. For illustration, the headrest cover 16 may have an internal projection or other abutment feature for abutment on the cross member 26 and/or the housing 37, 38 of the power drive of the actuator. The travel of the headrest relative to the guide bracket may be delimited by abutment of at least one abutment feature provided on the headrest cover 16 against the cross member 26 and/or the housing 37, 38 of the power drive of the actuator.

The attachment mount(s) and/or end stop(s) may be formed from a plastic material. The attachment mount(s) and/or end stop(s) may be molded onto the spindle so as form a spindle with attachment mount(s) and/or end stop(s) that are integrally formed with the spindle.

In operation of the headrest system, the motor of the power drive is supplied with energy. To adjust the height of the headrest in a first direction, e.g. upward, the shaft of the motor is made to rotate in a first rotation direction. Via a speed reduction transmission, the shaft of the motor causes the spindle nut 23 to rotate in a first direction. This causes the spindle 22 to be displaced relative to the spindle nut 23 and power drive 21 in a translational manner and in the first direction, e.g. upward. The spindle 22 does not rotate about its longitudinal axis 48. If a force is applied in a direction normal to the longitudinal axis during displacement, the spindle 22 may deflect due to its flexibility. With the spindle 22 being attached to the component 16 of the headrest, the displacement of the spindle 22 causes the headrest to be displaced relative to the rods 25. The headrest may be displaced in a translational manner in the first direction. The headrest may be displaced linearly in the first direction. The movement of the headrest may continue until the motor is stopped or until the second end stop 44 abuts on the corresponding abutment surface.

To adjust the height of the headrest in a second direction, e.g. downward, which is opposite to the first direction, the output shaft of the motor is made to rotate in a second rotation direction. Via a speed reduction transmission, the shaft of the motor causes the spindle nut 23 to rotate in a second direction. This causes the spindle 22 to be displaced relative to the spindle nut 23 and power drive 21 in a translational manner and in the second direction. The spindle 22 does not rotate about its longitudinal axis 48. If a force is applied in a direction normal to the longitudinal axis during displacement, the spindle 22 may deflect due to its flexibility. With the spindle 22 being attached to the component 16 of the headrest, the displacement of the spindle 22 causes the headrest to be displaced relative to the rods 25. The headrest may be displaced in a translational manner in the second direction. The headrest may be displaced linearly in the second direction. The movement of the headrest may continue until the motor is stopped or until the first end stop 42 abuts on the corresponding abutment surface.

Actuation of the motor may be controlled by an electric controller, as explained with reference to FIG. 1.

Figure 5:
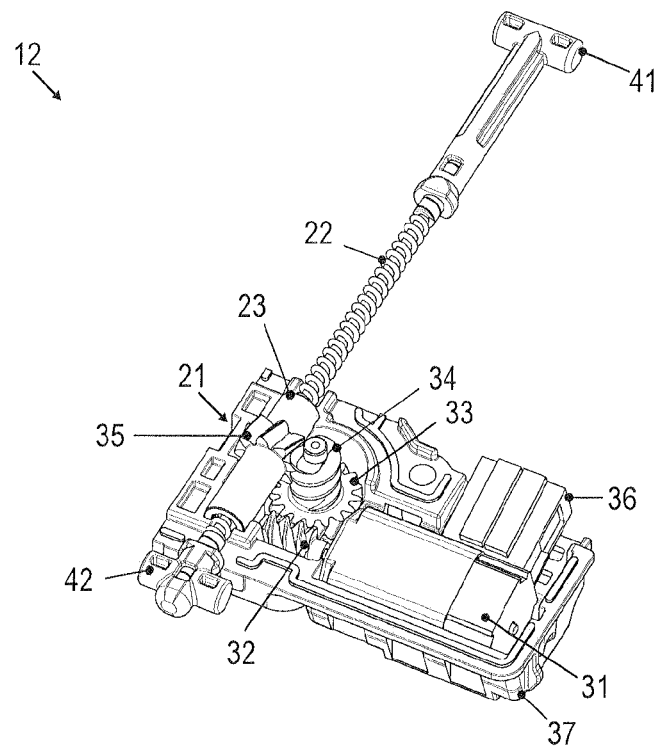
FIG. 5 is a perspective view of an actuator which may be used in the headrest system of FIG. 3.
Figure 6:
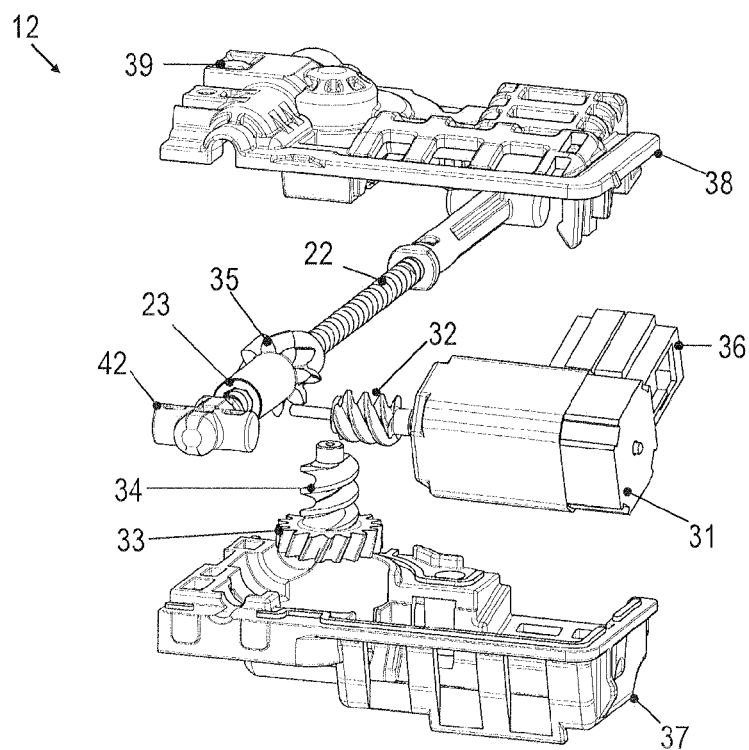
FIG. 6 is an exploded view of the actuator which may be used in the headrest system of FIG. 3.

FIG. 5 and FIG. 6 illustrate a configuration of an actuator 12 which may be used in the headrest system of FIG. 3 and FIG. 4. FIG. 5 shows the actuator with a first shell of a housing of the power drive removed. FIG. 6 shows the actuator in an exploded view. Features which correspond, in terms of configuration or function, to features explained with reference to FIG. 1 to FIG. 4 are designated with the same reference numerals.

The actuator 12 generally comprises a motor 31, the spindle 22 and a transmission coupled in between an output shaft of the motor 31 and the spindle 22. The motor may be an electric motor. The motor may in particular be a DC motor. The transmission may have several speed reduction stages. In the implementation shown in FIG. 5 and FIG. 6, the transmission comprises a two-stage worm transmission, the output of the two-stage worm transmission being coupled to the spindle nut 23 in a torque-prove manner. The actuator 12 is configured such that it can make the spindle nut 23 rotate about its longitudinal axis. With the spindle 22 being mounted such that it cannot rotate about its longitudinal axis 48, rotation of the spindle nut 23 causes the spindle 22 to be displaced in a translational fashion.

The actuator 12 is configured such that a worm 32 of a first worm transmission is coupled to the output shaft of the motor 31 in a rotationally fixed manner. I.e., the worm 32 rotates jointly with the output shaft of the motor 31. In an embodiment, the worm 32 may be integrally formed onto the output shaft of the motor 31. A worm gear 33 of the first worm transmission engages the worm 32.

A second worm 34 of a second worm transmission is coupled to the worm gear 33 of the first worm transmission in a rotationally fixed manner. I.e., the second worm 34 rotates jointly with the worm gear 33 of the first worm transmission. In an embodiment, the second worm 34 and the worm gear 33 of the first worm transmission may be formed on a common shaft. A second worm gear 35 engages the second worm 34. It will be appreciated that the worm 32 and worm gear 33 of the first worm transmission provide a rotation speed reduction, and that the second worm 34 and the second worm gear 35 engaged therewith provide further rotation speed reduction.

The second worm gear 35 is coupled to the spindle nut 23 in a rotationally fixed manner. In an embodiment, the second worm gear 35 may be formed onto an outer surface of the spindle nut 23. A rotary movement of the output shaft of the motor 31 causes the spindle nut 23 to rotate at a reduced speed compared to the rotation speed of the output shaft of the motor 31, the speed reduction being effected by the two-stage worm transmission 32-35. Torque is increased accordingly.

The spindle nut 23 has an internal thread engaging an outer thread of the spindle 22. Rotation of the spindle nut 23 effects a translational relative displacement between the spindle nut 23, as well as the other components of the power drive mounted to the rods 25, and the spindle 22.

The motor 31, the worm 32, the worm gear 33, the second worm 34, the second worm gear 35 and the spindle nut 23 are supported in a housing having housing shells 37 and 38. The housing shells 37 and 38 define recesses in which the worm 32, worm gear 33, second worm 34, second worm gear 35 and spindle nut 23 may be received so as to be rotatable. The housing shells 37, 38 may be attached to one another. The housing may have attachment features 39 for attachment to the guide bracket 13. For illustration, the housing with housing shells 37, 38 may be attached to the cross member 26 which extends between the rods 25 using screws, bolts, or other attachment means. The first and second attachment mounts 41, 42 of the spindle 22 may be engaged with the corresponding attachment features on the component 16 of the headrest.

The housing shells 37, 38 of the housing of the power drive may be attached to each other by a welded seam. The housing shells 37, 38 may be attached to each other by a welded seam formed by laser welding. The housing shells 37, 38 may be attached to each other by a welded seam formed by ultrasonic welding. Accordingly, a method of manufacturing the actuator 12 may comprise attaching the housing shells 37, 38 to each other by laser welding or by ultrasonic welding.

The actuator 12 is dimensioned such that it can be fully received in the cavity 19 formed in the interior of the headrest. The actuator 12 is configured such that the power drive with the motor 31 and two-stage worm transmission 32-35, the spindle 22 and the spindle nut 23 remain located within the cavity 19 in the interior of the headrest when the actuator 12 is actuated. In particular, the end stops 43, 44 on the spindle are positioned such that the actuator 12 remains located within the cavity throughout the travel of the headrest relative to the guide bracket which is permitted by the end stops.

A connector 36 and associated circuit board may be attached to the motor 31, so as to allow power to be supplied to the motor 31. If the connector 36 and circuit board, which defines an arrangement of connection pins, are provided so as to be connectable to the motor 31, the headrest adjusting mechanism may be readily adapted for use with different power supply systems. This may be beneficial when the headrest adjusting mechanism is to be used, for example, in different types of cars using different types of power connectors. The connector 36 and motor 31 may be configured such that the connector 36 may be attached to the motor 31 in a reversible manner, allowing the connector 36 to be removed again without damaging the motor 31 or the connector 36.

It will be appreciated that, for an actuator having at least one worm transmission coupled between the motor and the spindle transmission, a desired speed reduction may be attained in a small installation space. This facilitates the integration of the actuator in the interior of a headrest. The actuator may be designed to meet specific customer needs by suitably selecting the speed reduction transmission in accordance with a specified target speed reduction or torque increase.

While a configuration of an actuator has been explained with reference to FIG. 5 and FIG. 6, the actuator may have another configuration in other embodiments. For illustration, while an actuator 12 having a two-stage worm transmission is shown in FIG. 5 and FIG. 6, the actuator 12 may also have a single-stage worm transmission or at least three worm transmissions coupled in between the motor and the spindle nut 23. In still further embodiments, alternative transmission mechanisms may be utilized to convert the rotary output movement of the motor into a linear movement.

Figure 7:
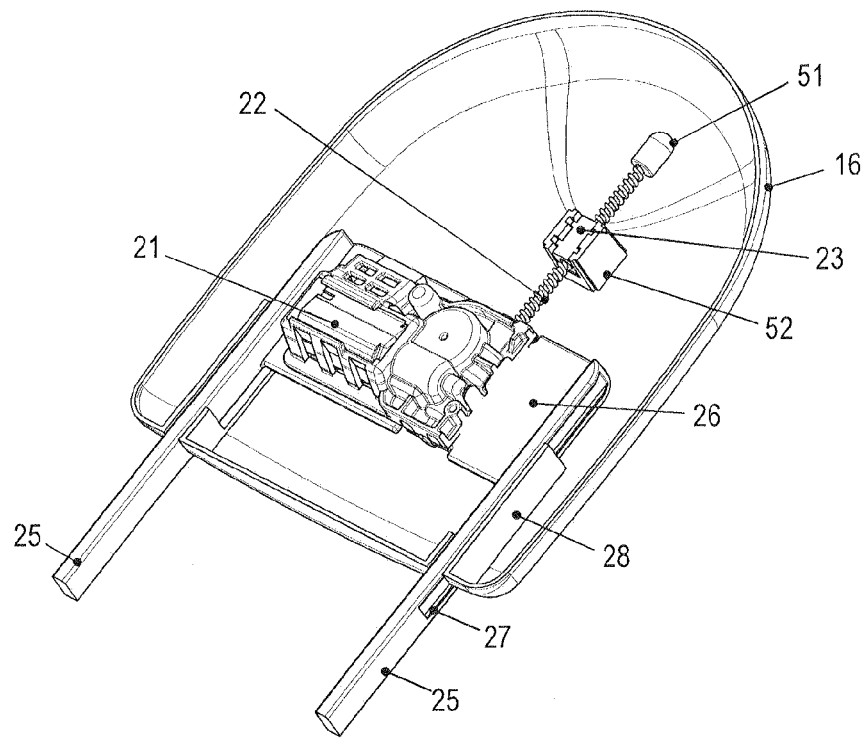
FIG. 7 is a perspective view of a headrest system according to another embodiment.
Figure 8:
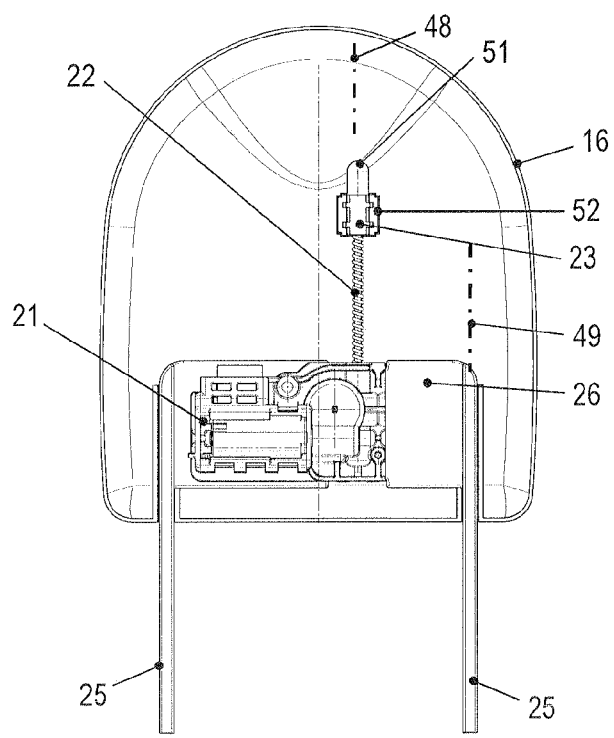
FIG. 8 is a plan view of the headrest system of FIG. 7.

With reference to FIG. 7 to FIG. 10, the configuration of a headrest system according to another embodiment will be explained in more detail. Features which correspond, in terms of configuration or function, to features explained with reference to FIG. 1 to FIG. 6 are designated with the same reference numerals. FIG. 7 shows a perspective view of the headrest system. FIG. 8 shows a plan view of the headrest system.

In the headrest system of FIG. 7 to FIG. 10, the spindle 22 is mounted such that it is rotatable about its longitudinal axis 48. The spindle nut 23 is mounted such that it cannot rotate about its longitudinal axis 48. The longitudinal axis 48 of the spindle nut 23 and spindle 22 is parallel to the longitudinal axis 49 of the guide elements which defines the direction of the travel path of the headrest.

The power drive 21 and spindle 22 are mounted to the rods 25 which, in the installed state, attach the headrest system to the backrest. The power drive 21 and spindle 22 may be attached to the cross member 26. The cross member 26 may have a recess 29, such as a cut-out, in which the power drive 21 and part of the spindle 22 are disposed. The power drive 21 includes an electric motor and may include a speed reduction transmission coupled between an output shaft of the electric motor and the spindle 22.

The spindle nut 23 is attached to the component 16 of the headrest. The component 16 may be or may include a half shell of a headrest cover. The spindle nut 23 may be attached to the component 16 in a rotationally fixed manner. An attachment feature 52 may be formed on the component 16 of the headrest to fix the spindle nut 23 in its rotational position. The spindle nut 23 may have an external shape which mates with the attachment feature 52.

The actuator may include a stop or a plurality of stops to delimit the travel of the headrest relative to the guide bracket. An end stop 51 may be provided at an end of the spindle 22. The end stop 51 may delimit movement of the spindle nut 23 relative to the power drive 21 and spindle 22 when the end stop 51 comes into abutment with a stop surface on the attachment feature 52. The stop surface which engages the end stop 51 may also be provided elsewhere on the component 16 of the headrest. A second end stop may be provided by a surface of the attachment feature 52 which may interact with a housing of the power drive 21. The second end stop may delimit movement of the spindle nut relative to the power drive 21 and spindle 22 when the surface of the attachment feature 52 comes into abutment with a stop surface on the housing of the power drive 21. The stop surface which engages the surface of the attachment feature 52 may also be provided on the cross member 26 or another component.

In operation of the headrest system, the motor of the power drive is supplied with energy. To adjust the height of the headrest in a first direction, e.g. upward, the shaft of the motor is made to rotate in a first rotation direction. Via a speed reduction transmission, the shaft of the motor causes the spindle 22 to rotate in a first direction. This causes the spindle nut 23 to be displaced relative to the spindle 22 and power drive 21 in a translational manner and in the first direction. The spindle nut 23 does not rotate about its longitudinal axis 48. If a force is applied in a direction normal to the longitudinal axis during displacement, the spindle 22 may deflect due to its flexibility. With the spindle nut 23 being attached to the component 16 of the headrest, the displacement of the spindle nut 23 causes the headrest to be displaced relative to the rods 25. The headrest may be displaced in a translational manner in the first direction. The headrest may be displaced linearly in the first direction. The movement of the headrest may continue until the motor is stopped or until the end stop 51 abuts on the corresponding abutment surface on the attachment feature 52.

To adjust the height of the headrest in a second direction, e.g. downward, which is opposite to the first direction, the output shaft of the motor is made to rotate in a second rotation direction. Via a speed reduction transmission, the shaft of the motor causes the spindle 22 to rotate in a second direction. This causes the spindle nut 23 to be displaced relative to the spindle 22 and power drive 21 in a translational manner and in the second direction. The spindle nut 23 does not rotate about its longitudinal axis 48. If a force is applied in a direction normal to the longitudinal axis during displacement, the spindle 22 may deflect due to its flexibility. With the spindle nut 23 being attached to the component 16 of the headrest, the displacement of the spindle nut 23 causes the headrest to be displaced relative to the rods 25. The headrest may be displaced in a translational manner in the second direction. The headrest may be displaced linearly in the second direction. The movement of the headrest may continue until the motor is stopped or until the surface of the attachment feature 52 abuts on the corresponding abutment surface on the housing of the power drive 21.

Actuation of the motor may be controlled by an electric controller, as explained with reference to FIG. 1.

Figure 9:
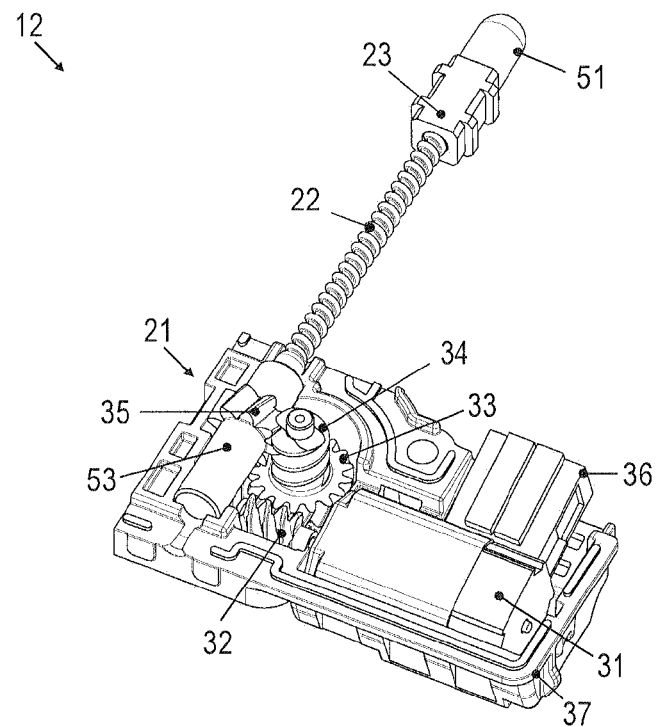
FIG. 9 is a perspective view of an actuator which may be used in the headrest system of FIG. 7.
Figure 10:
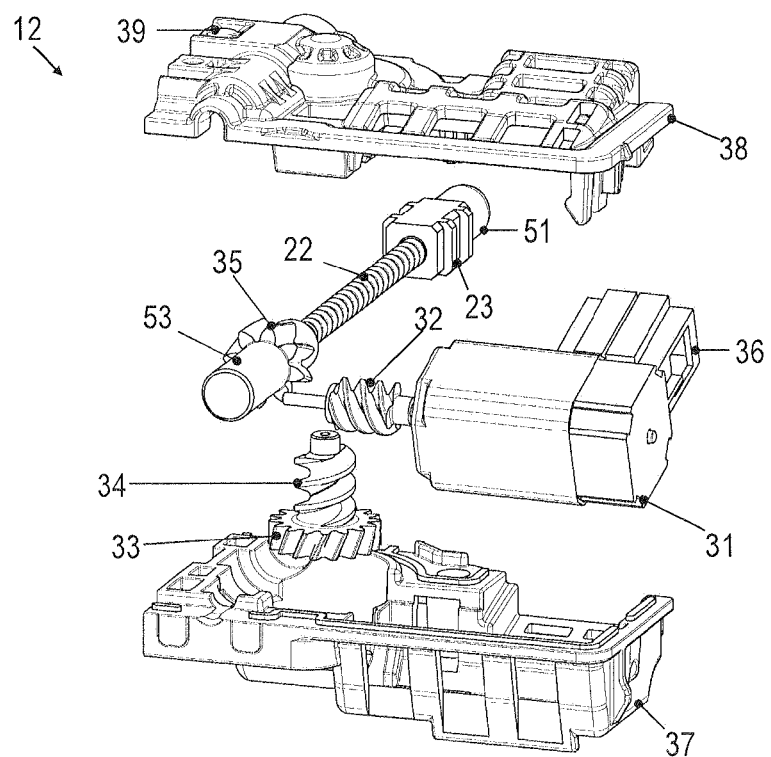
FIG. 10 is an exploded view of the actuator which may be used in the headrest system of FIG. 7.

FIG. 9 and FIG. 10 illustrate a configuration of an actuator 12 which may be used in the headrest system of FIG. 7 and FIG. 8. FIG. 9 shows the actuator with a first shell of a housing of the power drive removed. FIG. 10 shows the actuator in an exploded view. Features which correspond, in terms of configuration or function, to features explained with reference to FIG. 1 to FIG. 6 are designated with the same reference numerals.

The actuator 12 generally comprises a motor 31, the spindle 22 and a speed reduction transmission coupled in between an output shaft of the motor 31 and the spindle 22. The motor and the speed reduction transmission may be configured as explained with reference to FIG. 5 and FIG. 6. The speed reduction transmission which is coupled between the output shaft of the motor 31 and the spindle 22 may have several speed reduction stages. In the implementation shown in FIG. 9 and FIG. 10, the transmission comprises a two-stage worm transmission, the output of the two-stage worm transmission being coupled to the spindle 22 in a torque-prove manner. The actuator 12 is configured such that it can make the spindle 22 rotate about its longitudinal axis 48. With the spindle nut 23 being mounted such that it cannot rotate about its longitudinal axis 48, rotation of the spindle 22 causes the spindle nut 23 to be displaced in a translational fashion along the spindle 22.

The actuator 12 is configured such that a second worm gear 35 is coupled to the spindle 22 in a rotationally fixed manner. In an embodiment, the second worm gear 35 may be formed onto an outer surface of an end portion 53 of the spindle 22. The end portion 53 may be formed from plastic. A rotary movement of the output shaft of the motor 31 causes the spindle 22 to rotate at a reduced speed compared to the rotation speed of the output shaft of the motor 31, the speed reduction being effected by the two-stage worm transmission 32-35. Torque is increased accordingly.

The spindle nut 23 has an internal thread engaging an outer thread of the spindle 22. Rotation of the spindle 22 brings about a translational relative displacement between the spindle 22, as well as the other components of the power drive mounted to the rods 25, and the spindle nut 23.

The motor 31, the worm 32, the worm gear 33, the second worm 34, the second worm gear 35 and the end portion 53 of the spindle are supported in a housing having housing shells 37 and 38. The housing shells 37 and 38 define recesses in which the worm 32, worm gear 33, second worm 34, second worm gear 35 and end portion 53 of the spindle may be received so as to be rotatable. The housing shells 37, 38 may be attached to one another. The housing may have attachment features 39 for attachment to the guide bracket 13. The housing shells 37, 38 of the housing of the power drive may be attached to each other by a welded seam, e.g. by a welded seam formed by laser welding or ultrasonic welding. Accordingly, a method of manufacturing the actuator 12 may comprise attaching the housing shells 37, 38 to each other by laser welding or by ultrasonic welding.

Again, the actuator 12 of FIG. 9 and FIG. 10 is dimensioned such that it can be fully received in the cavity 19 formed in the interior of the headrest. The actuator 12 is configured such that the power drive with the motor 31 and two-stage worm transmission 32-35, the spindle 22 and the spindle nut 23 remain located within the cavity 19 in the interior of the headrest when the actuator 12 is actuated.

Other features and configurations of actuators may be used, as explained with reference to FIG. 5 and FIG. 6.

Figure 11:
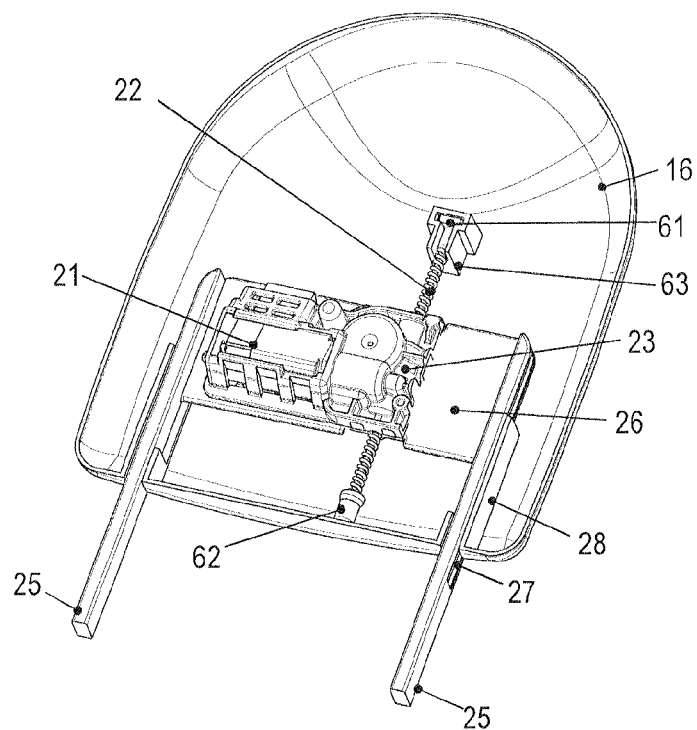
FIG. 11 is a perspective view of a headrest system according to another embodiment.
Figure 12:
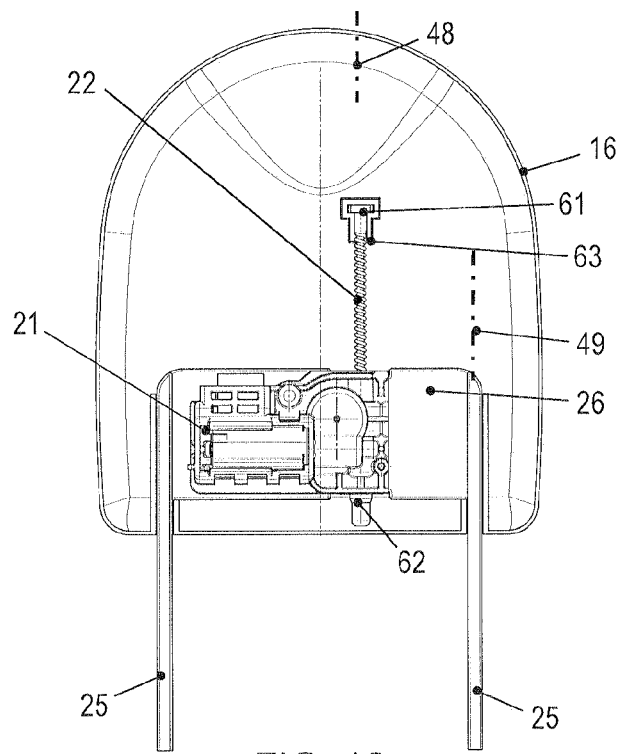
FIG. 12 is a plan view of the headrest system of FIG. 11.

With reference to FIG. 11 to FIG. 14, the configuration of a headrest system according to another embodiment will be explained in more detail. Features which correspond, in terms of configuration or function, to features explained with reference to FIG. 1 to FIG. 10 are designated with the same reference numerals. FIG. 11 shows a perspective view of the headrest system. FIG. 12 shows a plan view of the headrest system.

In the headrest system of FIG. 11 to FIG. 14, the spindle nut 23 is mounted such that it is rotatable about its longitudinal axis 48. The spindle 22 is mounted such that it cannot rotate about its longitudinal axis 48. The spindle 22 may be mounted to a component 16 of the headrest at one of its ends only. The longitudinal axis 48 of the spindle nut 23 and spindle 22 is parallel to the longitudinal axis 49 of the guide elements which defines the travel path of the headrest.

The power drive 21 and spindle nut 23 are mounted to the rods 25 which, in the installed state, attach the headrest system to the backrest. The power drive 21 and spindle nut 23 may be attached to the rods 25. The cross member 26 may have a recess, such as a cut-out, in which the power drive 21 and the spindle nut 23 are disposed. The power drive 21 includes an electric motor and may include a speed reduction transmission coupled between an output shaft of the electric motor and the spindle nut 23.

The spindle 22 is attached to the component 16 of the headrest. The component 16 may be or may include a half shell of a headrest cover. The spindle 22 may be attached to the component 16 in a rotationally fixed manner. The spindle 22 may have an attachment mount 61 at an end of the spindle 22. A mating attachment feature 63 may be formed on the component 16 of the headrest to fix the spindle 22 in its rotational position. The attachment mount 61 of the spindle 22 may have an external shape which mates with the attachment feature 63.

The actuator may include a stop or a plurality of stops to delimit the travel of the headrest relative to the guide bracket. An end stop 62 may be provided at an end of the spindle 22 which is opposite to the end at which the attachment mount 61 is provided. The end stop 62 is not directly affixed to the component 16. The end stop 62 may delimit movement of the spindle 22 relative to the power drive 21 and spindle nut 23 when the end stop 62 comes into abutment with a stop surface on the housing the power drive 21. The stop surface which engages the end stop 62 may also be provided elsewhere on the rods 25. A second end stop may be provided by the attachment mount 61 and/or by a surface of the attachment feature 63 which may interact with a housing of the power drive 21. The second end stop may delimit movement of the spindle 22 relative to the power drive 21 and spindle nut 23 when the attachment mount 61 and/or surface of the attachment feature 63 comes into abutment with a stop surface on the housing of the power drive 21. The stop surface which engages the surface of the attachment feature 63 may also be provided on the cross member 26 or another component.

In operation of the headrest system, the motor of the power drive is supplied with energy. To adjust the height of the headrest in a first direction, e.g. upward, the shaft of the motor is made to rotate in a first rotation direction. Via a speed reduction transmission, the shaft of the motor causes the spindle nut 23 to rotate in a first direction. This causes the spindle 22 to be displaced relative to the spindle nut 23 and power drive 21 in a translational manner and in the first direction. The spindle 22 does not rotate about its longitudinal axis 48. If a force is applied in a direction normal to the longitudinal axis during displacement, the spindle 22 may deflect due to its flexibility. With the spindle 22 being attached to the component 16 of the headrest, the displacement of the spindle 22 causes the headrest to be displaced relative to the rods 25. The headrest may be displaced in a translational manner in the first direction. The headrest may be displaced linearly in the first direction. The movement of the headrest may continue until the motor is stopped or until the end stop 62 abuts on the corresponding abutment surface.

To adjust the height of the headrest in a second direction, e.g. downward, which is opposite to the first direction, the output shaft of the motor is made to rotate in a second rotation direction. Via a speed reduction transmission, the shaft of the motor causes the spindle nut 23 to rotate in a second direction. This causes the spindle 22 to be displaced relative to the spindle nut 23 and power drive 21 in a translational manner and in the second direction. The spindle 22 does not rotate about its longitudinal axis 48. If a force is applied in a direction normal to the longitudinal axis during displacement, the spindle 22 may deflect due to its flexibility. With the spindle 22 being attached to the component 16 of the headrest, the displacement of the spindle 22 causes the headrest to be displaced relative to the rods 25. The headrest may be displaced in a translational manner in the second direction. The headrest may be displaced linearly in the second direction. The movement of the headrest may continue until the motor is stopped or until the attachment mount 61 and/or attachment feature 63 abuts on the corresponding abutment surface.

Actuation of the motor may be controlled by an electric controller, as explained with reference to FIG. 1.

Figure 13:
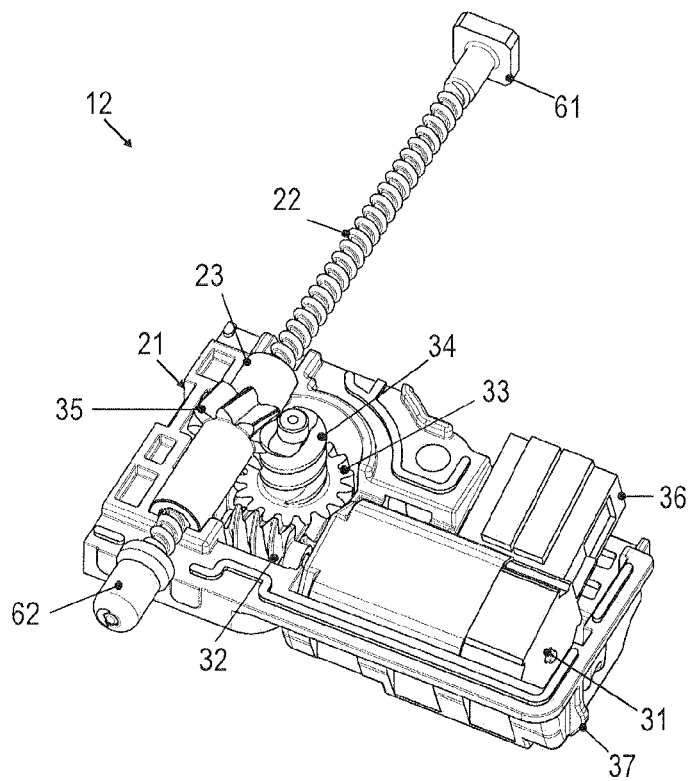
FIG. 13 is a perspective view of an actuator which may be used in the headrest system of FIG. 11.
Figure 14:
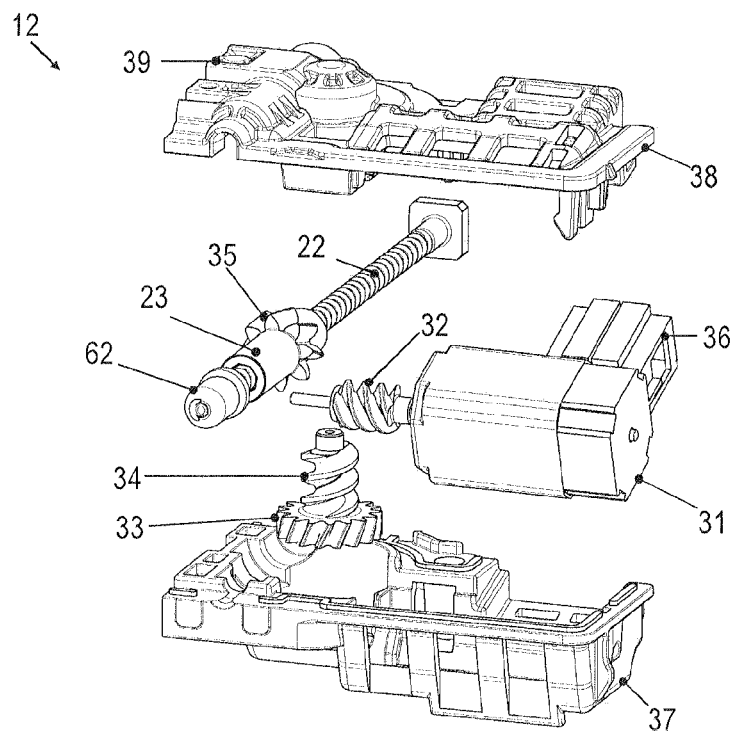
FIG. 14 is an exploded view of the actuator which may be used in the headrest system of FIG. 11.

FIG. 13 and FIG. 14 illustrate a configuration of an actuator 12 which may be used in the headrest system of FIG. 11 and FIG. 12. FIG. 13 shows the actuator with a first shell of a housing of the power drive removed. FIG. 14 shows the actuator in an exploded view. Features which correspond, in terms of configuration or function, to features explained with reference to FIG. 1 to FIG. 10 are designated with the same reference numerals.

The actuator 12 generally comprises a motor 31, the spindle 22 and a speed reduction transmission coupled in between an output shaft of the motor 31 and a spindle nut 23. The motor and transmission may be configured as explained with reference to FIG. 5 and FIG. 6. The transmission which is coupled between the output shaft of the motor 31 and the spindle 22 may have several speed reduction stages. In the implementation shown in FIG. 9 and FIG. 10, the transmission comprises a two-stage worm transmission, the output of the worm transmission being coupled to the spindle nut 23 in a torque-prove manner. The actuator 12 is configured such that it can make the spindle nut 23 rotate about its longitudinal axis 48. With the spindle 22 being mounted such that it cannot rotate about its longitudinal axis 48, rotation of the spindle nut 23 causes the spindle 22 to be displaced in a translational fashion.

The actuator 12 is configured such that a second worm gear 35 is coupled to the spindle nut 23 in a rotationally fixed manner. In an embodiment, the second worm gear 35 may be formed onto an outer surface of the spindle nut 23. A rotary movement of the output shaft of the motor 31 causes the spindle nut 23 to rotate at a reduced speed, the speed reduction being effected by the two-stage worm transmission 32-35. Torque is increased accordingly.

The spindle nut 23 has an internal thread engaging an outer thread of the spindle 22. Rotation of the spindle nut 23 brings about a translational relative displacement between the spindle nut 23, as well as the other components of the power drive mounted to the rods 25, and the spindle 22.

The motor 31, the worm 32, the worm gear 33, the second worm 34, the second worm gear 35 and the spindle nut 23 are supported in a housing having housing shells 37 and 38. The housing shells 37 and 38 define recesses in which the worm 32, worm gear 33, second worm 34, second worm gear 35 and spindle nut 23 may be received so as to be rotatable. The housing shells 37, 38 may be attached to one another. The housing may have attachment features 39 for attachment to the guide bracket 13. The housing shells 37, 38 of the housing of the power drive may be attached to each other by a welded seam, e.g. by a welded seam formed by laser welding or ultrasonic welding. Accordingly, a method of manufacturing the actuator 12 may comprise attaching the housing shells 37, 38 to each other by laser welding or by ultrasonic welding.

Again, the actuator 12 of FIG. 13 and FIG. 14 is dimensioned such that it can be fully received in the cavity 19 formed in the interior of the headrest. The actuator 12 is configured such that the power drive with the motor 31 and two-stage worm transmission 32-35, the spindle 22 and the spindle nut 23 remain located within the cavity 19 in the interior of the headrest when the actuator 12 is actuated.

Other configurations of actuators may be used, as explained with reference to FIG. 5 and FIG. 6.

Various modifications may be implemented in yet further embodiments. For illustration, while the power drive and the one of the spindle and spindle nut which can be rotationally driven may be attached to the rods 25, as explained with reference to FIG. 2 to FIG. 14, other configurations can be used. For illustration, the power drive and the one of the spindle and spindle nut which can be rotationally driven may be attached to a component 16 of the headrest. In this case, the other one of the spindle and spindle nut which is mounted such that it cannot rotate about its longitudinal axis may be attached in the rods 15.

Figure 15:
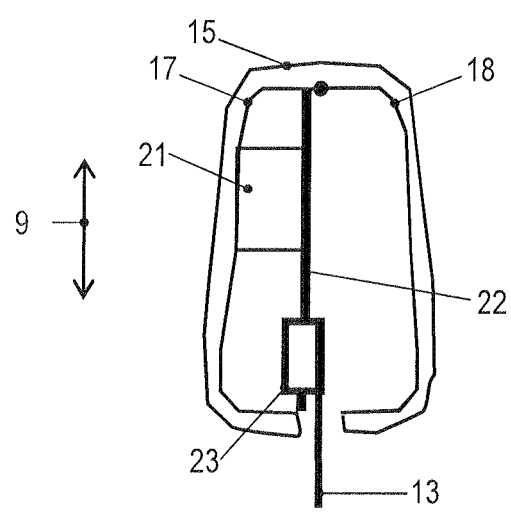
FIG. 15 is a schematic cross-sectional view of a headrest system according to another embodiment.

FIG. 15 is a schematic cross-sectional view through a headrest system of another embodiment which uses such a configuration. The cross-section is taken in a plane in which a spindle of a spindle transmission extends and which is perpendicular to a transverse centre plane of the headrest. The actuator generally includes a power drive 21 and a spindle transmission. The spindle transmission includes a spindle 22 and a spindle nut 23 through which the spindle 22 extends. The spindle nut 23 may have an internal helical thread. The spindle 22 may have a mating external helical thread. The external thread of the spindle 22 and the internal thread of the spindle nut 23 may be threadingly engaged.

As illustrated in FIG. 15, the power drive 21 may be attached to the headrest. The power drive 21 may be mounted to a shell of a headrest cover. The power drive may be configured to rotationally drive the spindle 22. When the headrest is displaced relative to the guide bracket 13, the power drive 21 is also displaced relative to the guide bracket 13. The spindle nut 23 is affixed to the guide bracket 13 such that it cannot rotate about its longitudinal axis. Rotation of the spindle 22 causes the spindle 22 and components attached thereto, including power drive 21 and headrest, to be displaced relative to the guide bracket 13.

In still other implementations, the power drive 21 and a rotatable spindle nut 23 may be attached to the headrest cover. The spindle 22 may be affixed to the guide bracket 13 such that it cannot rotate about its longitudinal axis. Rotation of the spindle nut 23 causes the spindle nut 23 and components attached thereto, including power drive 21 and headrest, to be displaced relative to the guide bracket 13.

While embodiments of the invention have been described with reference to the drawings, various modifications may be implemented in further embodiments. For illustration, while an actuator has been described in which a two-stage worm transmission is coupled between the rotary output shaft of an electric motor and a spindle transmission, in other embodiments the drive mechanism may comprise only one or at least three worm transmission stages. In other embodiments, another speed reduction mechanism may be provided.

In each one of the various embodiments, the one of the spindle and spindle nut which is attached to a component of the headrest and the corresponding attachment features on the component of the headrest may be configured so as to facilitate attachment. For illustration, an attachment mount on the spindle or spindle nut may be retained by an attachment feature of the headrest in a form fit, allowing the spindle or spindle nut to be attached to the component of the headrest by simply inserting the attachment mount in an insertion direction transverse to the longitudinal axis 48. Alternatively or additionally, the attachment mount on the spindle or spindle nut and/or the attachment feature on the headrest may be configured for a snap engagement, allowing the spindle or spindle nut to be snapped onto the headrest.

While embodiments have been described in which the headrest is adjusted linearly in the height direction, other adjustments may be implemented. The adjustment mechanism of embodiments may also be combined with other mechanisms which are located outside the headrest cavity. For illustration, the headrest systems of embodiments may be combined with mechanisms for pivoting the headrest forward, e.g. for safety reasons in an accident, or rearward. The latter mechanisms may have triggers which still reside in the backrest of the seat.

While embodiments have been described in which an end stop or several end stops are formed on a spindle, one or several end stops may also be formed on the headrest cover 16, e.g. on one of the half shells 17, 18, to limit travel of the headrest relative to the guide bracket. The end stop(s) may be integrally formed on the headrest cover 16.

It will be appreciated that various technical effects can be attained using the headrest systems and methods of embodiments. The actuator has a compact construction, which allows it to be integrated into the internal cavity of the headrest. The speed reduction mechanism allows compact electric motors to be used. A low weight and inexpensive construction may be realized.

The headrest systems of some embodiments provide a modular construction which allows the adjustable headrest to be easily integrated with a conventional backrest. The actuator can be easily adapted to various adjustment speeds and adjustment forces. For illustration, the speed reduction transmission between the output shaft of the motor and the spindle transmission may be adjusted depending on customer needs. Alternatively or additionally, the adjustment travel may be adapted. This can be done easily by suitably positioning the end stops of the actuator. A typical travel of the headrest which may be realized in some headrest systems may be on the order of 50 mm.

While exemplary embodiments have been described in the context of a height adjustment of a headrest of a vehicle seat, embodiments of the invention are not limited to this particular field of application. Rather, embodiments of the invention may be advantageously employed to adjust headrests in a wide variety of seats.

What is claimed is:

1. A headrest system, comprising:
   a headrest including a headrest cover;
   a guide bracket to which the headrest is mounted such that the headrest is displaceable relative to the guide bracket; and
   an actuator coupled to the headrest and the guide bracket, the actuator configured to displace the headrest relative to the guide bracket, the actuator including a spindle transmission and a power drive coupled to the spindle transmission, the spindle transmission having a spindle and a spindle nut engaged with the spindle, the spindle nut and the spindle each having a longitudinal axis, the power drive coupled to the spindle via the spindle nut, and the power drive arranged in a cavity defined within an outer shell of the headrest cover,
   wherein one of the spindle and the spindle nut is rotatable about its respective longitudinal axis, and wherein the other one of the spindle and the spindle nut is not rotatable about its respective longitudinal axis and is coupled to the headrest cover.

2. The headrest system of claim 1, wherein the spindle and the spindle nut are arranged in the cavity.

3. The headrest system of claim 1 further including a guide element which defines a travel path of the headrest relative to the guide bracket, wherein the spindle extends along the travel path defined by the guide element.

4. The headrest system of claim 3, wherein the longitudinal axis of the spindle is parallel to a longitudinal axis of the guide element.

5. The headrest system of claim 3, wherein the actuator is configured to effect a translational displacement of the headrest along the guide element.

6. The headrest system of claim 3, wherein the headrest system is configured such that the power drive, the spindle and the spindle nut are located within the cavity for any position of the headrest relative to the guide bracket along the travel path.

7. The headrest system of claim 1, wherein the power drive is supported on the guide bracket.

8. The headrest system of claim 7, wherein the guide bracket comprises a pair of rods which extend from the headrest, and wherein the power drive is attached to the pair of rods.

9. The headrest system of claim 1, wherein the power drive comprises a motor and the actuator has at least one worm transmission which is coupled between the motor and the spindle transmission.

10. The headrest system of claim 1, wherein the spindle has at least one attachment mount attached to the headrest cover such that the spindle is not rotatable about its longitudinal axis, the power drive configured to rotationally drive the spindle nut, and wherein the spindle nut is rotatable about its longitudinal axis.

11. The headrest system of claim 10, wherein the spindle has two attachment mounts provided at opposing ends of the spindle, the two attachment mounts being respectively attached to the headrest cover.

12. The headrest system of claim 1, wherein the spindle nut is attached to the headrest cover such that the spindle nut is not rotatable about its longitudinal axis, the power drive configured to rotationally drive the spindle, and wherein the spindle is rotatable about its longitudinal axis.

13. The headrest system of claim 1, wherein an end stop is provided on at least one end of the spindle.

14. The headrest system of claim 1, wherein the spindle is flexible.

15. The headrest system of claim 14, wherein the spindle is a flexible shaft provided with an external thread, wherein the flexible shaft has a metal core comprising one metal wire or a plurality of metal wires.

16. A seat comprising:
   a backrest; and
   a headrest system according to claim 1, the guide bracket of the headrest system attached to the backrest.

17. A method of adjusting a headrest, the headrest mounted to a guide bracket so as to be displaceable relative to the guide bracket, the headrest including an actuator coupled to the headrest, a headrest cover, and the guide bracket, the method comprising:
   activating a power drive of the actuator arranged in a cavity defined within an outer shell of the headrest cover to drive a spindle transmission of the actuator, the spindle transmission including a spindle and a spindle nut engaged with the spindle, the spindle nut and the spindle each having a longitudinal axis, the power drive coupled to the spindle via the spindle nut, and the spindle transmission arranged to effect a relative displacement between the headrest and the guide bracket when the spindle transmission is driven by the power drive,
   wherein one of the spindle and the spindle nut is rotatable about its respective longitudinal axis, and wherein the other one of the spindle and the spindle nut is not rotatable about its respective longitudinal axis and is coupled to the headrest cover.

* * * * *